United States Patent [19]
Wilt

[11] 3,857,576
[45] Dec. 31, 1974

[54] TANK MOUNTING STRUCTURE
[76] Inventor: Theodore G. Wilt, c/o T. G. Wilt Farm Employment, Box 397, Shelbina, Mo. 63468
[22] Filed: Mar. 18, 1974
[21] Appl. No.: 452,423

[52] U.S. Cl.................. 280/5 A, 239/172, 280/5 H
[51] Int. Cl............................................ B60p 3/22
[58] Field of Search................. 280/5 A, 5 H, 5 R; 239/172

[56] References Cited
UNITED STATES PATENTS

| | | | |
|---|---|---|---|
| 2,109,384 | 2/1938 | Gallupe | 239/172 X |
| 2,424,468 | 7/1947 | Keathley | 239/172 X |
| 2,743,934 | 5/1956 | Chambers et al. | 280/5 H |
| 3,311,183 | 3/1967 | Phillips | 280/5 H X |
| 3,488,061 | 1/1970 | Hansen et al. | 280/5 A |

Primary Examiner—Leo Friaglia
Attorney, Agent, or Firm—Fishburn, Gold & Litman

[57] ABSTRACT

A tank mounting structure for mounting first and second spray solution tanks on an agricultural tractor with the first tank on one side and the second tank on the other side of the tractor with each of the tanks being positioned between respective front and rear wheels of the tractor. The tanks are each supported in a respective cradle assembly each of which has a tank support frame with a plurality of support members extending therefrom and supportingly received by a respective plurality of mounting members of a mounting assembly removably attached to and suspended beneath the tractor frame, said tanks, cradle and support members being bodily removable from the mounting structure and presenting an absence of portions extending laterally outwardly of tractor.

12 Claims, 5 Drawing Figures

TANK MOUNTING STRUCTURE

The present invention relates generally to agricultural sprayers, and more particularly to a structure for mounting sprayer solution tanks on opposite sides of an agricultural tractor.

Previously, tanks for most agricultural sprayers have been mounted on a trailer pulled behind a tractor and used in conjunction with a sprayer boom on the tractor or on the trailer. The trailer-mounted solution tanks have been satisfactory as long as the only function being performed was that of applying a liquid chemical, such as a herbicide, pesticide, or fertilizer, however, in recent years it has become common practice to combine the spraying functions with one or more earthworking functions, such as applying pre-emergence weed spray behind a planter. In the situation where the earth-working implement, such as a planter, is mounted to the rear of the tractor, it is no longer feasible to pull a trailer-mounted solution tank behind the tractor. Also, in many instances where the only function being performed is that of spraying, it is desirable to supplement the capacity of the trailer-mounted solution tanks.

To solve difficulties of trailer-mounted solution tanks, the tanks have been mounted on the sides of a tractor intermediate the front and rear wheels. However, prior to the present invention, all of the attachments or structures for mounting solution tanks to the sides of a tractor have had some disadvantages, such as requiring considerable work in securing the attachment or structure to the tractor, not being able to support tanks with sufficient capacity, obstructing the view of the tractor operator in the forward direction, having structure projecting beyond the sides of the tractor when tanks are not supported thereon, and being time consuming in the mounting and removing of the entire attachment or of a portion thereof.

The tank mounting structure of the present invention includes a mounting assembly having spaced parallel tubular members extending transversely of the tractor frame and terminating in opposite ends adjacent the tractor frame. Tank supporting cradles each have spaced parallel members supporting same and telescopingly engaged in the tubular members of the mounting assembly.

The principal objects of the present invention are: to provide a tank mounting structure adapted to overcome the disadvantages of prior art structures for mounting sprayer solution tanks on the sides of agricultural tractors; to provide such a tank mounting structure having a removably attached mounting assembly with end portions thereof positioned in close proximity to the sides of the agricultural tractor thereby having a minimum overhand of a tractor frame when tank support frame are not in portion; to provide such a tank mounting structure having first and second tank support frames easily mounted on or detachable from the mounting assembly; to provide such a tank mounting structure adapted to support sprayer solution tanks of substantial capacity; to provide such a tank mounting structure having a minimum obstruction of the tank operator's forward view; and to provide such a tank mounting structure which is strong, compact, light in weight, simple in design, easily attached to the frame of the tractor, adjustable to mount on various sizes and types of agricultural tractors, economical to manufacture, and particularly well adapted for the proposed use.

Other objects and advantages of this invention will become apparent from the following description, taken in connection with the accompanying drawings, wherein are set forth, by way of illustration and example, certain embodiments of this invention.

The drawings constitute a part of this specification and include an exemplary embodiment of the present invention and illustrate various objects and features of the tank mounting structure for agricultural tractors.

Figure 1:
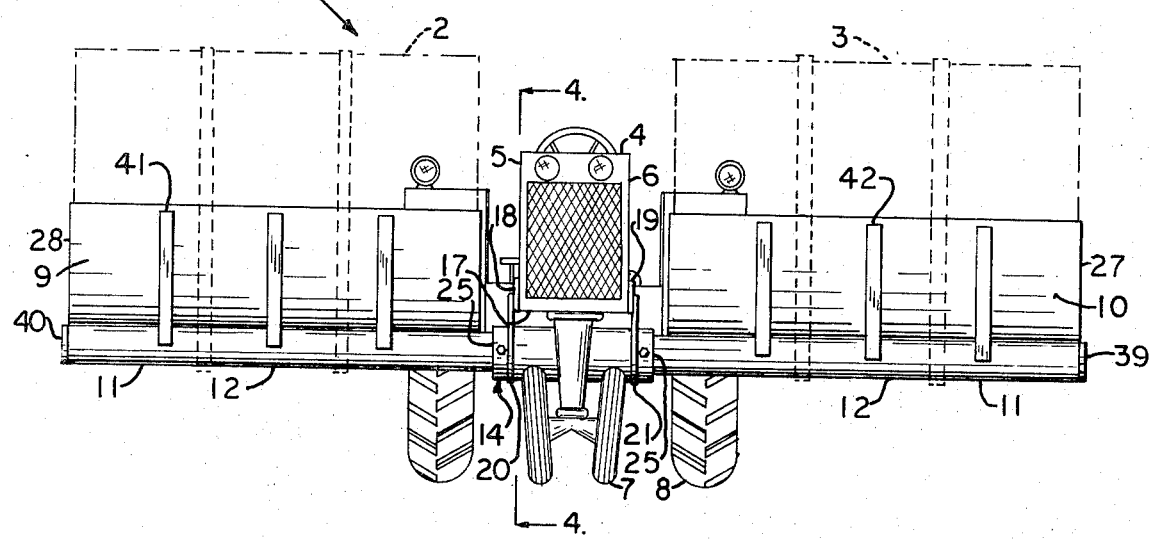
FIG. 1 is a front elevational view of an agricultural tractor having mounted thereon a tank mounting structure embodying features of the present invention.
Figure 2:
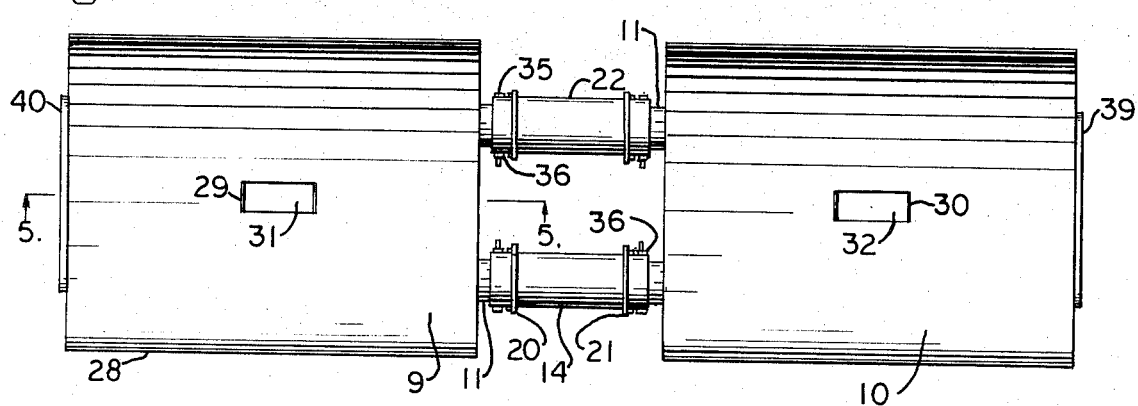
FIG. 2 is a top plan view of the tank-mounting structure.
Figure 3:
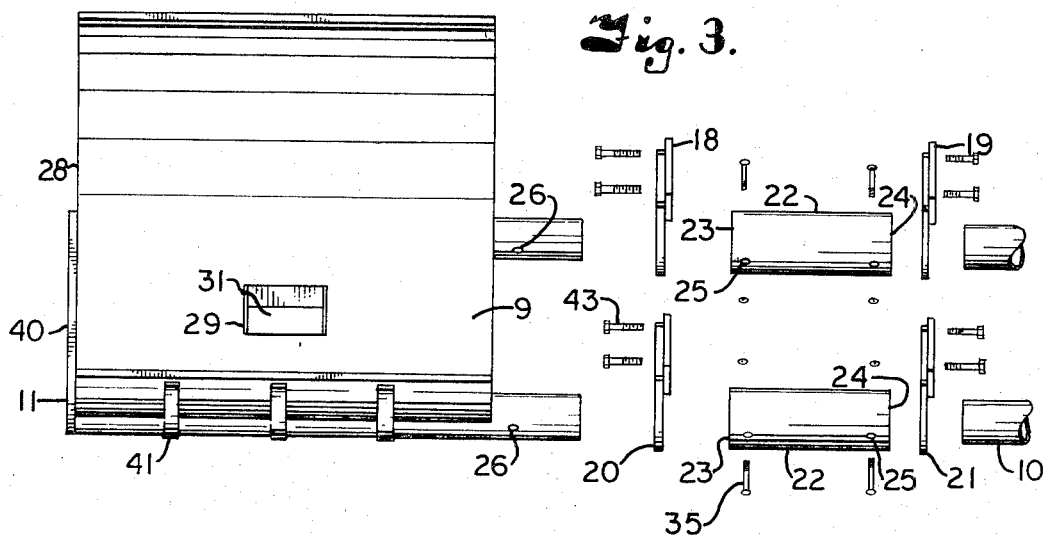
FIG. 3 is an exploded perspective view of the tank-mounting structure.
Figure 4:
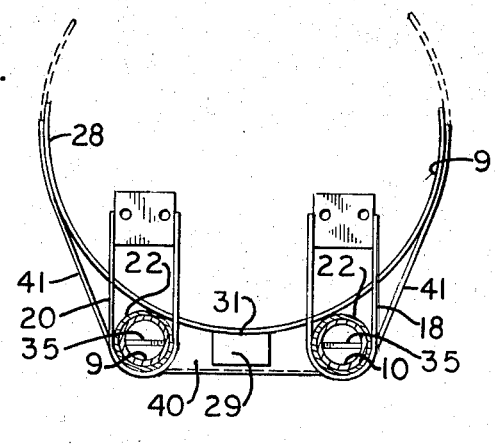
FIG. 4 is an enlarged transverse sectional view taken on line 4—4, FIG. 1
Figure 5:
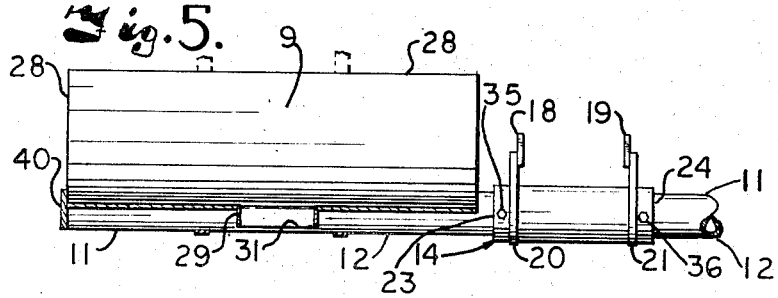
FIG. 5 is an enlarged longitudinal sectional view taken on line 5—5, FIG. 2.

Referring more in detail to the drawings:

As required, detailed embodiments of the present invention are disclosed herein, however, it is to be understood that the disclosed embodiments are merely exemplary of the present invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designate a tank-mounting structure for mounting a first tank 2 and a second tank 3 containing suitable spray solution on an agricultural tractor 4. The first tank 2 is mounted on one side 5 of the tractor 4 and the second tank 3 is mounted on the other side 6 of the tractor 4. The first and second tanks 2 and 3 are longitudinally positioned between front wheels 7 and rear wheels 8 of the tractor 4. The first and second tanks 2 and 3 are supported in cradle assemblies 9 and 10 respectively, each of which have a tank support frame 11 with a plurality of support members 12 extending therefrom with each of these support members 12 being received in a respective one of a plurality of mounting member of a mounting assembly 14 removably attached to side members of a frame 17 of the tractor 4 and suspended or positioned below the tractor frame 17.

The mounting assembly 14 includes at least one bracket on each side of the frame 17 of the tractor 4 and the bracket is removably attached to respective side members of the tractor frame 17. There may be any number of the brackets on each side of the frame 17, as determined by the magnitude of the load to be supported by the mounting assembly 14. The brackets may be one long bracket on each side of the tractor frame 17 or a plurality of individual brackets on each side. In the illustrated structure, a plurality of opposed pairs of brackets 18 and 19 are longitudinally spaced along the tractor frame 17 with the brackets 18 and 19 being mounted on respective side members of the tractor frame 17.

Hangers 20 and 21 are secured to and depend from the brackets 18 and 19 respectively. The hangers 20 and 21 may be any suitable structural member adapted to supportingly engage one of a plurality of mounting members 22, as later described. In the illustrated structure, the hangers 20 and 21 are each bars formed in a U-shaped or loop pattern having the upper ends thereof suitably secured to the brackets 18 and 19 respectively, as by welding, and having the lower end portion thereof extending below the tractor frame 17. In the illustrated structure, there is one hanger for each bracket.

The mounting members 22 each extend transversely of and are positioned below the side frame members of the tractor frame 17. The mounting members 22 each have opposite end portions 23 and 24 supportingly engaged by the hangers 20 and 21 respectively. The mounting members 22 may be any suitable member adapted to receive the support members 12 of the tank support frames 11, such as elongated tubular members with the end portions 23 and 24 thereof being open to receive the respective support members 12 therein. The end portions 23 and 24 of the mounting members 22 each have aligned apertures 25 therein, for a purpose later described.

The tank support frames 11 are each adapted to be positioned on a respective side of the frame 17 of the tractor 4 and the frames 11 each have a plurality of the elongated support members 12 extending outwardly therefrom and each of the support members 12 are adapted to be in supported engagement with a respective end portion of one of the mounting members 22 of the mounting assembly 14. The support members 12 may be any suitable structural shape, such as round bars, pipe, or the like, adapted to be received in supported engagement by the mounting members 22. The support members 12 each have apertures 26 adjacent one end thereof with the apertures 26 in the support members 12 being adapted to be moved into alignment with the apertures 25 in a respective one of the end portions 23 or 24 of the mounting members 22.

The cradle assemblies 9 and 10 include cradle members 27 and 28 mounted on the respective tank support frame 11 thereof. The cradle members 27 and 28 are transversely arcuate and suitably secured to the respective tank support frame 11, as by welding to the support members 12, and the cradle members 27 and 28 are adapted to receive the first and second tanks 2 and 3 respectively therein.

The first and second tanks 2 and 3 are placed on their sides in the cradle members 27 and 28 respectively and the first and second tanks 2 and 3 have sump portions 29 and 30 respectively adapted to permit clean-out of the respective tanks. The cradle members 27 and 28, therefore, have means defining openings 31 and 32 respectively in a lower portion thereof adapted to permit the sump portions 29 and 30 to extend downwadly through the openings 31 and 32 respectively.

The openings 31 and 32 are provided with substantially smooth edges to prevent damage to the respective sump portions 29 and 30 and in the illustrated structure, a longitudinally extending cut is centered in each of the cradle members 27 and 28 and a respective transversely extending cut is positioned at each end of each longitudinally extending cut and portions adjacent said longitudinally extending cut are folded or bent downwardly to define the edges of the openings 31 and 32 respectively. A respective transversely extending bar or plate is suitably secured, as by welding, to the downwardly folded portions of each of the cradle members 27 and 28 to define respective ends of the openings 31 and 32 and reinforce the respective downwardly folded portions.

Fastening means are adapted to engage the support members 12 of each of the tank support frames 11 and respective end portions of the mounting members 22 for retaining the tank support frames 11 in supported engagement with the mounting assembly 14. In the illustrated structure, suitable bolts 35 extend through respective aligned apertures 25 and 26 and are secured in place by suitable nuts 36.

The cradle members 27 and 28 are shaped to conform to the exterior surface of the first and second tanks 2 and 3 respectively and support at least 120° of the exterior surface of the respective tank whereby the tanks should remain in the cradle members 27 and 28 during normal operations, however, it is desirable to provide positive means engaging the tanks 2 and 3 and the cradle members 27 and 28 respectively for retaining the tanks 2 and 3 in the respective cradle members. Therefore, suitable flexible belts or straps may be positioned to extend around the cradle members 27 and 28 and the tanks 2 and 3 respectively therein.

It is desirable to prevent or substantially reduce movement if the tanks 2 and 3 laterally or transversely of the direction of travel of the tractor 4, therefore, end members 39 and 40 are suitably secured to the cradle members 27 and 28 at their respective outer ends whereby the end member 39 is mounted on the outer end of the cradle member 27 and engageable by the respective end of the first tank 2 and the end member 40 is mounted on the outer end of the cradle member 28 and engageble by the respective end of the second tank 3.

It is desirable to provide a substantially rigid structure for the cradle members 27 and 28. Therefore, reinforcing members 41 and 42 are suitably secured to exterior surfaces of the cradle members 27 and 28 respectively. The reinforcing members 41 and 42 are positioned on each side of the cradle members 27 and 28 respectively and are illustrated as plates or straps each extending from adjacent a respective upper edge of the respective side of the respective cradle member to the adjacent support member 12. Respective opposite end portions of each of the reinforcing members 41 and 42 are secured to the respective side of the respective cradle member and to the respective support member 12, as by welding.

In using a tank mounting structure as illustrated and described, the brackets 18 and 19 are suitably mounted on the side members of the tractor frame 17, as by suitable fastening members, such as bolts or screws 43. The brackets 18 and 19 are aligned in opposed pairs having the hangers 20 and 21 adapted to receive respective end portions 23 and 24 of the mounting members 22. The tank support frames are then positioned with the support members 12 received in telescoping engagement in the respective end portions 23 and 24 of the mounting members 22 and the ends of the support members 12 are positioned inwardly of the mounting members 22 and below the tractor frame 17 thereby providing a strong structure in the mounting area. The bolts 35 are extended through the aligned apertures 25 and 26 and secured in place by the nuts 36. The tanks 2 and 3 are then positioned in the cradle members 27 nd 28 with the sump portions 29 and 30 thereof extending through the openings 31 and 32 respectively. The flexible strps are then secured in place around the tanks 2 and 3. The tractor 4 and the tanks 2 and 3 are thereby prepared for the desired use.

When it is desired to use the tractor 4 in other agricultural operations, the bolts 35 and nuts 36 may be removed and the tank support frames 11 removed from the mounting assembly 14. The mounting members 22 may remain in place in the mounting assembly 14 or be removed if desired while the tractor 4 is performing other operations.

It is to be understood that while I have illustrated and described one form of my invention, it is not to be limited to the specific form or arrangement or parts herein described and shown.

What I claim and desire to secure by letters Patent is:

1. A tank mounting structure for use with a tractor having a longitudinally extending frame, said tank mounting structure comprising:
   a. a mounting assembly removably attached to a frame of a tractor, said mounting assembly including a plurality of spaced mounting members each extending transversely of the frame of the tractor and each having opposite end portions;
   b. a first and second tank support frame each adapted to be positioned on a respective side of the frame of the tractor and each having a plurality of elongated support members extending outwardly therefrom and each in removably supported engagement with a respective one of said mounting members of said mounting assembly;
   c. an elongated transversely arcuate cradle member for each of said first and second tank support frames, each cradle member being secured to said respective tank support frame and adapted to receive a respective tank therein; and
   d. fastening means engaging each of said elongated support members of each of said first and second tank support frames and respective mounting members of said mounting assembly for retaining said first and second tank support frames in supported engagement with said mounting assembly.

2. A tank mounting structure as set forth in claim 1 wherein said mounting assembly includes:
   a. at least one bracket on each side of the frame of the tractor and removably attached thereto; and
   b. a plurality of hangers for each side of the frame of the tractor and each depending from a respective one of said brackets, said hangers each supportingly engaging a respective end portion of a respective one of said mounting members.

3. A tank mounting structure as set forth in claim 1 wherein each of said cradle members has means defining an opening in a lower portion thereof permitting a sump portion of the tank received in said respective cradle member to extend downwardly through said opening.

4. A tank mounting structure as set forth in claim 2 including:
   a. means on each of said cradle members for defining an opening in a lower portion thereof, said opening being adapted to permit a sump portion of the tank received in said respective cradle member to extend downwardly through said opening; and
   b. means engaging each of said cradle members and the respective tank received therein for retaining the tank in said respective cradle member.

5. A tank mounting structure a set forth in claim 3 wherein said mounting assembly includes:
   a. a plurality of brackets on each side of the frame of the tractor, each of said brackets being removably attached to the respective side of the tractor, said brackets being arranged in a plurality of opposed pairs; and
   b. a hanger for each of said brackets and depending therefrom, each hanger being adapted to receive therein a respective end portion of a respective one of said tubular mounting members for supporting same.

6. In combination, a tractor and a tank mounting assembly comprising:
   a. a tractor having a frame including a pair of opposed side frame members and front and rear wheels;
   b. a plurality of brackets removably mounted on each of said side frame members of said tractor, said brackets being arranged in a plurality of laterally aligned pairs;
   c. a plurality of hangers each depending from a respective one of said brackets;
   d. a plurality of mounting members each extending transversely of and below said side frame members of said tractor, each of said mounting members having opposite end portions each supported on a respective one of said hangers;
   e. a first tank support frame and a second tank support frame each adapted to be positioned on a respective side of said frame of said tractor and each having a plurality of elongated support members extending outwardly therefrom, said support members each being adapted to be in supported engagement with a respective one of the end portions of a respective one of said mounting members;
   f. an elongated transversely arcuate cradle member for each of said first and second tank support frames, each cradle member being secured to said respective tank support frame;
   g. fastening means engaging each of said elongated support members of said first and second tank support frames and respective mounting members for retaining said first and second tank support frames in supported engagement with said mounting members;
   h. a tank for and received in each of said cradle members; and
   i. means engaging each of said tanks and said respective cradle members for retaining said tanks in said respective cradle members.

7. The combination as set forth in claim 6 wherein each of said cradle members has means defining an opening in a lower portion thereof, said opening being adapted to permit a sump portion of said respective tank received in said respective cradle member to extend downwardly through said opening.

8. A tank mounting structure for use with a tractor having a longitudinally extending frame having a pair of opposed side members and front and rear wheels, said tank mounting structure comprising:
   a. at least one bracket on each side of a frame of a tractor, said brackets each being removably attached to a respective side of the tractor frame and in transversely opposed relation;
   b. a plurality of hangers each depending from a respective one of said brackets, said hangers being arranged in a plurality of opposed pairs with each pair having a hanger on each side of the frame of the tractor;

c. a plurality of tubular mounting members each extending transversely of and positioned below the frame of the tractor, each of said mounting members having opposite end portions each received in and supported on a respective one of said hangers;

d. a first tank support frame and a second tank support frame each adapted to be positioned on a respective side of the frame of the tractor and each having a plurality of elongated support members extending outwardly therefrom, said support members each being adapted to be received in supported engagement in a respective one of the end portions of a respective one of said tubular mounting members, said support members each being telescopingly received in a respective one of said tubular mounting members;

e. an elongated transversely arcuate cradle member for each of said first and second tank support frames, each cradle member being secured to said respective tank support frame and adapted to receive a respective tank therein; and f. fastening means engaging each of said elongated support members of said first and second tank support frames and respective end portions of said tubular mounting members for retaining said first and second tank support frames in supported engagement with said mounting members.

9. A tank mounting structure as set forth in claim 8 wherein:

a. each side of the tractor has a plurality of spaced brackets thereon;

b. said brackets are arranged in a plurality of opposed pairs; and c. each of said brackets has a hanger depending therefrom.

10. A tank mounting structure as set forth in claim 9 wherein each of said cradle members has means defining an opening in a lower portion thereof permitting a sump portion of the tank received in said respective cradle member to extend downwardly through said opening.

11. A tank mounting structure as set forth in claim 10 including end members mounted on each end of each of said cradle members and engageable by the tank received in said respective cradle member to thereby retain the tank against movement laterally of the direction of travel of the tractor.

12. A tank mounting structure as set forth in claim 11 wherein each of said cradle members has means thereon adapted to receive and retain a plurality of elongated flexible straps, each flexible strap engaging the tank received in said respective cradle member for retaining the tank in said respective cradle member.

* * * * *